(No Model.)

J. G. SCHWEINFURTH.
PUZZLE.

No. 588,116. Patented Aug. 10, 1897.

Witnesses
C. B. Rinehart
P. K. McMiller

Inventor
J. G. Schweinfurth
By his Attorney P. Byrne

THE NORRIS PETERS CO., PHOTO-LITHO., WASHINGTON, D. C.

UNITED STATES PATENT OFFICE.

JOHN GEORGE SCHWEINFURTH, OF BIRMINGHAM, ALABAMA, ASSIGNOR OF ONE-HALF TO HENRY T. DEAN, OF SAME PLACE.

PUZZLE.

SPECIFICATION forming part of Letters Patent No. 588,116, dated August 10, 1897.

Application filed May 17, 1897. Serial No. 636,934. (No model.)

*To all whom it may concern:*

Be it known that I, JOHN GEORGE SCHWEINFURTH, a citizen of the United States, residing at Birmingham, in the county of Jefferson and State of Alabama, have invented certain new and useful Improvements in Amusement Devices; and I do hereby declare the following to be a full, clear, and exact description of the invention, such as will enable others skilled in the art to which it appertains to make and use the same.

My invention relates to improvements in an amusement device in which round balls are operated in conjunction with a concave shelf inclosed in a transparent receptacle.

The objects of my improvement are, first, to provide a metallic base having a transparent receptacle attached thereto; second, to provide a raised platform attached to the base, the platform provided with a gap in the edge and an aperture or opening in the center thereof; third, to provide a series of round balls in the receptacle and provide a concave shelf under the platform for the reception of the balls. I attain these objects by the device illustrated in the accompanying drawings, in which—

Figure 1:
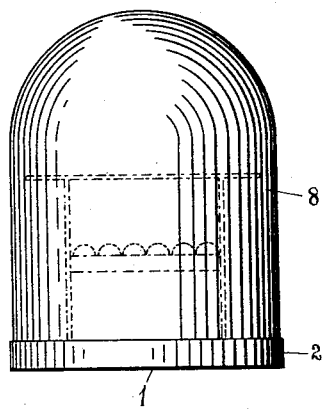
Figure 2:
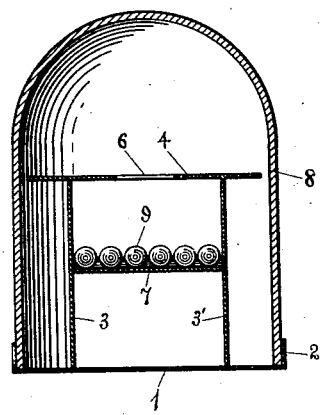
Figure 3:
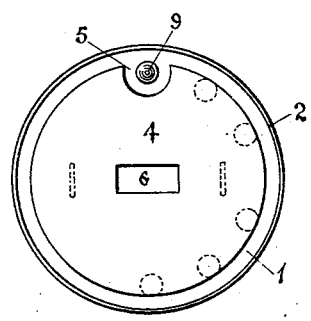
Figure 4:
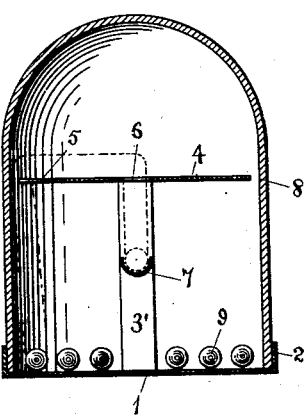

Figure 1 is a vertical side view of the complete device. Fig. 2 is a vertical sectional view of the same through the center. Fig. 3 is a plan view of the base, showing a top view of the raised platform. Fig. 4 is a vertical cross-sectional view of Fig. 1 through the center.

Similar numerals refer to similar parts throughout the several views.

The base 1 is made of any suitable metallic material, the rim 2 being turned up on the outer edge thereof. Two vertical uprights 3 3' are attached to the base, the uprights extending upward and having attached to their heads a platform 4. The platform is provided with a gap 5, formed on the edge, an opening or aperture of any desired form 6 being formed in the center thereof. A concave shelf 7 is attached to the uprights 3 3', the shelf being placed about midway between the base and the platform.

The receptacle or cover 8 is made of glass or any other suitable transparent material. It is inclosed at the head, which can be made of any desired form. The receptacle is formed open at the bottom and when attached to the base and held to place by the raised rim thereof the whole forms an inclosed receptacle.

A series of shot or round balls 9, made of any desired material, are inclosed or placed on the base of the receptacle.

To operate the device, the receptacle is turned partly on the side while held in the hand, the inclination given being sufficient to get one or more balls to ascend through the gap 5 to the raised platform. The ball or balls when elevated on the platform are slightly agitated or rolled on the platform to induce the balls to fall through the opening 6 and to be caught in the concave shelf, the balls resting therein. The operation is continued until all the balls are placed in the shelf, as shown in Fig. 2. The direction the balls take to reach the shelf is shown by dotted lines in Fig. 4.

Having thus described my invention, what I claim as new, and desire to secure by Letters Patent, is—

An amusement device consisting of a base having a transparent receptacle attached thereto, two vertical uprights attached to the base and extending upward therefrom, a platform attached to the heads of the uprights, the platform having a gap formed in the edge thereof, an opening or aperture being formed in the center of the platform, a concave shelf attached to the uprights between the base and the platform, and a series of balls inclosed in the receptacle, substantially as and for the purpose described.

In testimony whereof I affix my signature in presence of two witnesses.

JOHN GEORGE SCHWEINFURTH.

Witnesses:
P. K. MCMILLER,
S. W. JONES.